United States Patent
Williams et al.

(10) Patent No.: US 6,260,105 B1
(45) Date of Patent: Jul. 10, 2001

(54) MEMORY CONTROLLER WITH A PLURALITY OF MEMORY ADDRESS BUSES

(75) Inventors: Mike W. Williams, Citrus Heights; Jasmin Ajanovic, Folsom; Joseph H. Salmon, Placerville, all of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/954,620

(22) Filed: Oct. 20, 1997

(51) Int. Cl.⁷ .................................................... G06F 12/06
(52) U.S. Cl. ............................................................ 711/105
(58) Field of Search ..................................... 711/100, 104, 711/105, 154, 5; 710/128

(56) References Cited

U.S. PATENT DOCUMENTS

| | | | | |
|---|---|---|---|---|
| 5,129,059 | * | 7/1992 | Hannah | 345/517 |
| 5,479,624 | * | 12/1995 | Lee | 711/1 |
| 5,848,253 | * | 12/1998 | Walsh et al. | 710/129 |

\* cited by examiner

Primary Examiner—Kevin L. Ellis
(74) Attorney, Agent, or Firm—Kenyon & Kenyon

(57) ABSTRACT

A memory controller for a computer system includes a first memory address bus and a second memory, address bus. The memory controller further includes circuitry that toggles one of the first and second memory address buses at a time. Because only one memory address bus is toggled at once, the first and second memory address buses can share power and ground pins, thereby reducing the number of power and ground pins on the memory controller.

22 Claims, 5 Drawing Sheets

MEMORY CONTROLLER WITH A PLURALITY OF MEMORY ADDRESS BUSES

FIELD OF THE INVENTION

The present invention is directed to a memory controller. More particularly, the present invention is directed to a memory controller with a plurality of memory address buses.

BACKGROUND OF THE INVENTION

A typical computer includes a processor and memory. Frequently a memory controller is coupled between the processor and the memory. One function of the memory controller is to oversee the movement of data into and out of the memory.

FIG. 1 is a block diagram of a memory controller 20 coupled to memory in a typical computer. The memory is installed in a plurality of memory slots 10–13. Memory slots 10–13 support memory devices such as dynamic random access memory ("DRAM") devices that are packaged as single in-line memory modules ("SIMMS") and dual in-line memory modules ("DIMMS").

Memory controller 20 in FIG. 1 includes a memory address bus 22 for addressing each memory device. Memory address bus 22 is a multiple bit bus, and each bit typically requires a memory address pin on memory controller 20.

Increasing the number of memory devices in the computer increases the load on memory address bus 22. When the number of memory devices exceed a fixed amount, the resulting load prevents memory address bus 22 from functioning properly. Therefore, when the fixed amount is exceeded, memory address bus 22 cannot be directly coupled to the memory devices in memory slots 10–13.

One known method for reducing the load on memory address bus 22 when the number of memory devices are increased is shown in FIG. 1. Memory address bus 22 is first input to buffers 30, 40. Buffers 30, 40 are then coupled respectively to memory slot 10–11 and 12–13. As shown, buffer 30 is coupled to memory slot 10 via line 32 and memory slot 11 via line 34. Similarly, buffer 40 is coupled to memory slot 12 via line 42 and memory slot 13 via line 44. The buffers reduce the load on memory address bus 22.

However, adding buffers 30, 40 to the computer increases the cost of the computer. Further, buffers 30, 40 decrease the performance of the computer because they add a time delay between memory controller 20 and the memory modules inserted in slots 10–13. Therefore, it is desirable to eliminate buffers 30, 40.

One way to eliminate buffers 30, 40 and still reduce the load on memory address bus 22 is to add an additional memory address bus to memory controller 20. Each memory address bus therefore has only half of the load imposed on it by the memory devices in memory slots 10–13. However, this requires the number of memory address pins on memory controller 20 to be doubled.

Further, integrated circuits such as memory controller typically have a maximum ratio of input/output ("I/O") pins to each power and ground pin. When the ratio is increased, the I/O signals are subjected to increased ground bounce and increased simultaneous switching output induced delay which are detrimental to a computer. If the ratio exceeds the maximum, the computer that includes the integrated circuit may not be operable. For a typical memory controller coupled to DRAMs, the maximum ratio of memory address bus pins to each power and ground pin can be approximately 4:1. Therefore, for every four memory address pins on bus 22, memory controller 20 requires one power pin and one ground pin.

Because of the maximum ratio, if the number of memory address bus pins on memory controller 20 is doubled as described above, the number of required power and ground pins also increases. However, it is desirable to minimize the number of pins on memory controller 20 because as the number of pins increase, the corresponding number of pads on the memory controller's die must also be increased. This requires the size of the die itself to also be increased, which greatly increases the cost of memory controller 20. Based on the foregoing, there is a need for a memory controller that is not required to be coupled to buffers, and that has a minimal number of pins.

SUMMARY OF THE INVENTION

A memory controller according to one embodiment of the present invention includes a first memory address bus and a second memory address bus. The memory controller further includes circuitry that toggles one of the first and second memory address buses at a time.

DETAILED DESCRIPTION

One embodiment of the present invention is a memory controller that includes two memory address buses. The memory controller has a reduced number of power and ground pins because only one of the memory address buses is toggled at a time.

Figure 1:
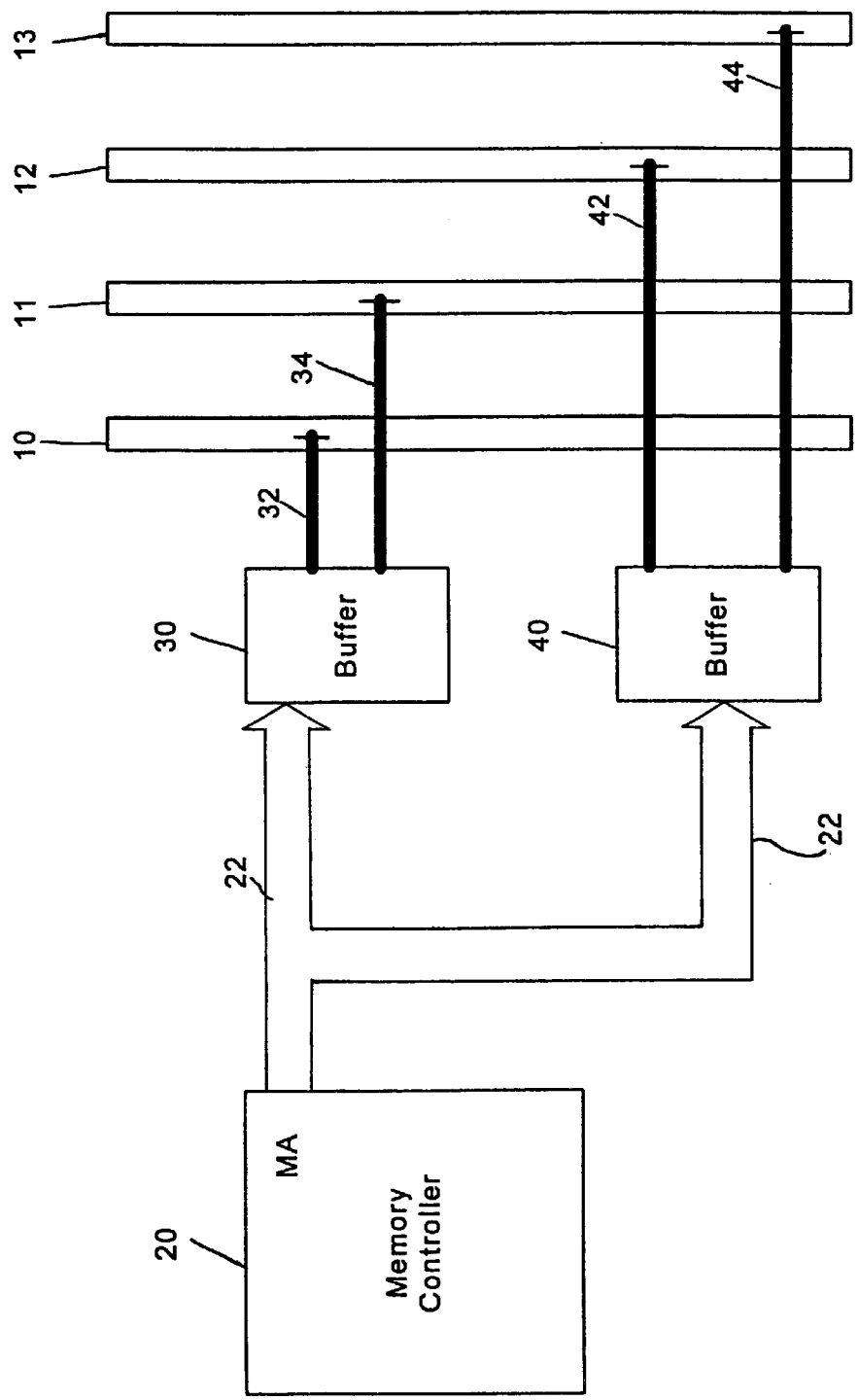
FIG. 1 is a block diagram of a prior art memory controller coupled to memory in a typical computer.
Figure 2:
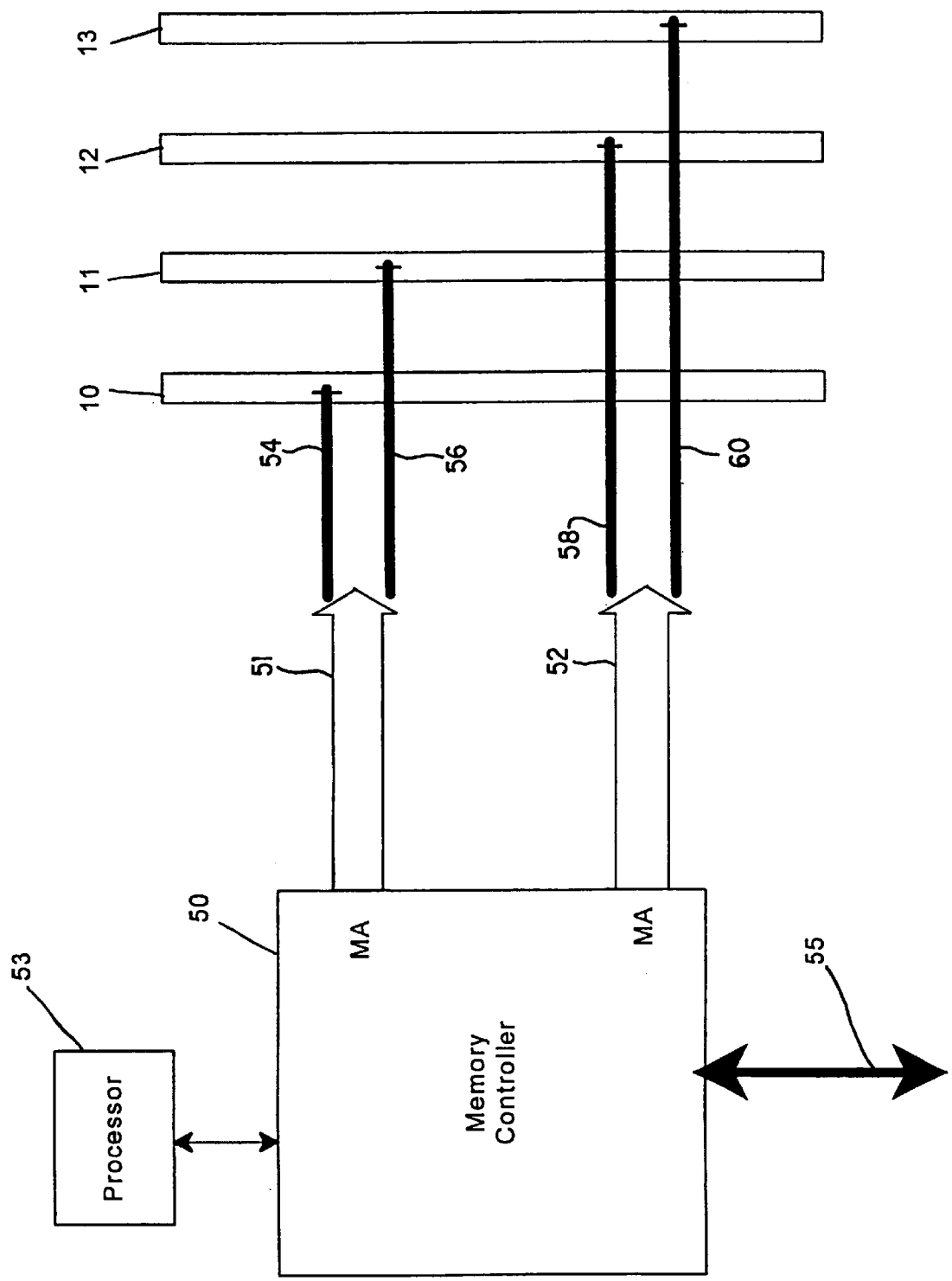
FIG. 2 is a block diagram of a memory controller coupled to memory slots in a computer in accordance with one embodiment of the present invention.

FIG. 2 is a block diagram of a memory controller coupled to memory slots in a computer in accordance to one embodiment of the present invention. The memory controller 50 includes two memory address buses: memory address bus 51 and memory address bus 52. Each memory address bus is coupled to different memory slots 10–13. Specifically, memory address bus 51 is coupled to memory slot 10 via line 54 and memory slot 11 via line 56. Similarly, memory address bus 52 is coupled to memory slot 12 via line 58 and memory slot 13 via line 60. Memory modules (e.g., SIMMS, DIMMS populated with SRAM or DRAM), not shown in FIG. 2, can be inserted in slots 10–13.

Memory controller 50 is also coupled to other devices and buses in the computer that require access to memory slots 10–13. For example, a processor 53 and a system bus 55 are typically coupled to memory controller 50.

Memory controller 50 has a reduced number of power and ground pins as compared to prior art memory controllers with an equal number of memory address buses. Specifically, memory controller 50 does not require one power and one ground pin for every four pins of memory address buses 51 and 52 because memory controller 50 toggles the pins of only one of the memory address buses 51, 52 at a time. This allows memory address buses 51, 52 to share each power and ground pin, and the ratio of memory address bus pins to power and ground pins is increased to approximately 8:1. Therefore, the memory address bus pins in memory controller 50 require approximately one-half of the power and ground pins required by the prior art memory address bus pins.

Figure 3:
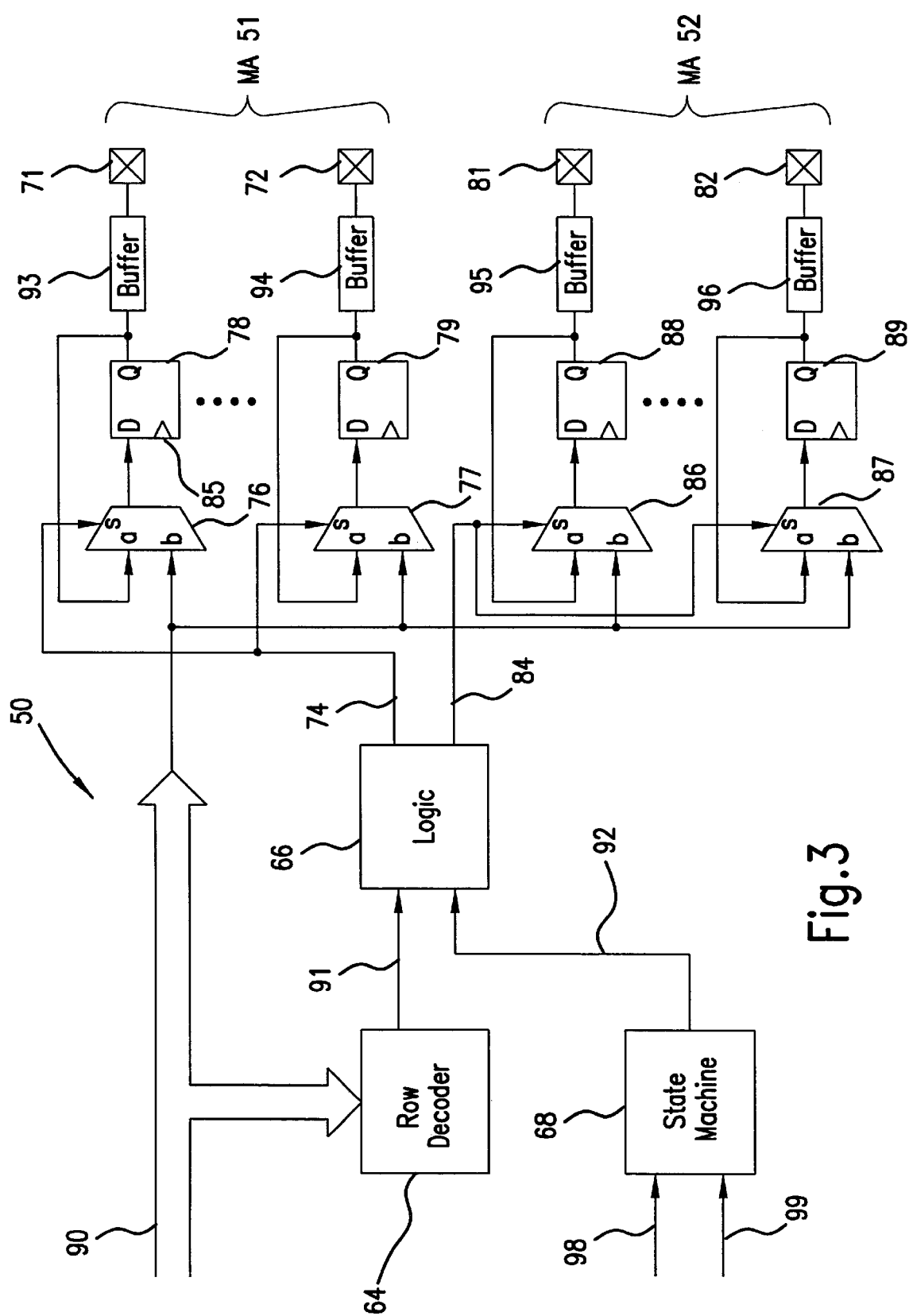
FIG. 3 is an overview of the circuitry within a memory controller in accordance with one embodiment of the present invention for toggling one memory address bus at a time.

FIG. 3 is an overview of the circuitry within memory controller 50 for toggling one memory address bus 51, 52 at a time. FIG. 3 illustrates two pins 71, 72 of memory address bus 51 and two pins 81, 82 of memory address bus 52. Other pins of buses 51, 52 not shown in FIG. 3 are coupled to identical circuitry as pins 71, 72, 81, 82. In one embodiment, memory address buses 51 and 52 are thirteen bits wide and therefore each include thirteen pins.

A request bus 90 transmits memory requests to the circuitry of FIG. 3 within memory controller 50. Memory requests are requests to access memory and are generated by devices internal and external to memory controller 50. Each memory request typically includes a memory address, the type of memory access (i.e., read or write) and the size of the memory access.

In one embodiment, each memory slot 10–13 shown in FIG. 2 includes two logical memory rows for a total of eight logical rows. The memory rows are numbered consecutively from 0–7. Memory slot 10 includes logical memory rows 0 and 1, memory slot 11 includes logical memory rows 2 and 3, and so on.

Request bus 90 is coupled to a row decoder 64. Row decoder 64 determines which of a plurality of memory rows includes the memory module requested by the memory request.

The memory row determined by decoder 64 is input to a logic block 66 via line 91. Logic block 66 functions as a source of output enable lines 74, 84. Also input to logic block 66 is the output of a state machine 68 via line 92. State machine 68 receives a plurality of inputs 98, 99 from for example, requesting sources and internal status registers. State machine 68 determines when a particular memory row can be loaded based on various operating conditions required by the memory devices in the memory row (e.g., memory refresh status, loading conditions, etc.).

Each pin 71, 72, 81, 82 is coupled to pads (not shown in FIG. 3), output buffers 93–96 respectively, and associated driver logic. The associated driver logic includes a D-type flip-flop 78, 79, 88, 89 and a two-input multiplexer 76, 77, 86, 87. The "Q" output of each flip-flop is input to an input "a" of its corresponding multiplexer. The output of each multiplexer is input to the "D" input of its corresponding flip-flop. Each flip-flop also includes a clock input (e.g., clock input 85) that is coupled to a system clock (not shown in FIG. 3).

Logic block 66 outputs enable signals on two enable lines 74, 84. When one enable line is "on", the other enable line is always "off." Enable line 74 is input to a selector input "s" of multiplexers 76, 77. Enable line 84 is input to a selector input "s" of multiplexers 86, 87. Each bit of the requested memory address received from memory request bus 90 is input to an input "b" of multiplexers 76, 77, 86, 87. When an "on" signal is sent to the selector input, the signal on input "b" is output from multiplexers 76, 77, 86, 87. Otherwise, the signal on input "a" is output from multiplexers 76, 77, 86, 87.

In operation, referring to pin 71, when enable line 74 is "on", the memory address bit at input "b" of multiplexer 76 is output to flip-flop 78 where it is clocked to pin 71. Therefore, when enable line 74 is "on", pin 71 is toggled or "loaded". However, when enable line 74 is "off", the last value of pin 71 is output from multiplexer 76 through input "a" and then clocked to pin 71 through flip-flop 78. Therefore, when enable line 74 is "off", pin 71 does not toggle. The remaining pins 72, 81, 82 operate in an identical manner. Because only one enable line 74, 84 is "on" at one time, only one memory address bus 51, 52 will be toggled or loaded at a time. This allows the pins from each memory address bus 51, 52 to share the power and ground pins.

Figure 4:
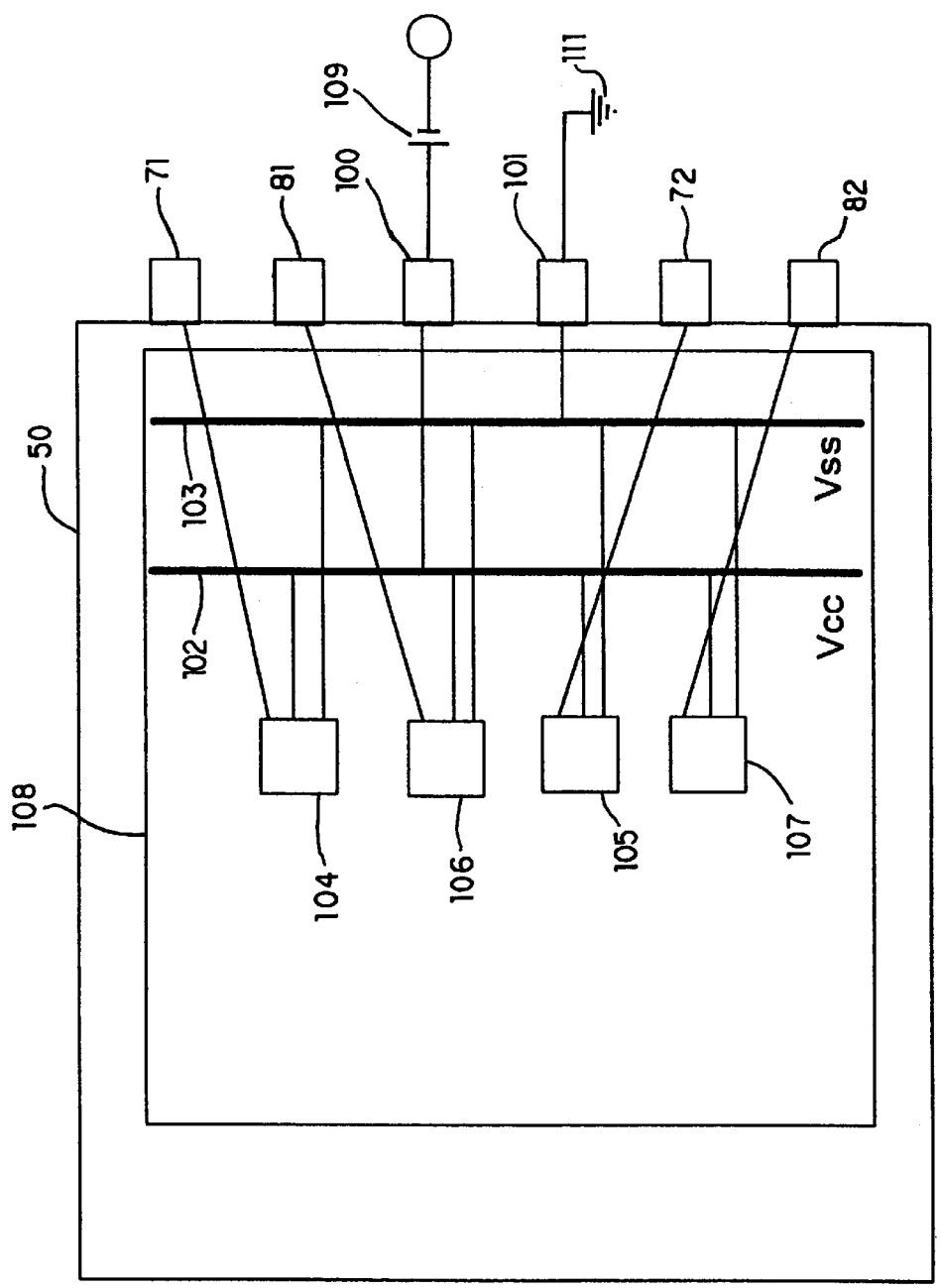
FIG. 4 illustrates an example of pins coupled to pads in the memory controller in accordance with one embodiment of the present invention.

Every pin in memory controller 50 is coupled to a pad. The pads are coupled to the die of memory controller 50. In one embodiment, the pads of memory controller 50 are arranged so that a pad of memory address bus 51 is always adjacent to a pad of memory address bus 52. FIG. 4 illustrates an example of pins coupled to pads in memory controller 50 for this embodiment.

In FIG. 4, controller 50 includes a die 108. Controller 50 further includes pins 71 and 72 of memory address bus 51, and pins 81 and 82 of memory address bus 52. A power pin 100 is coupled to a power bus 102 and a power source 109. A ground pin 101 is coupled to a ground bus 103 and a ground source 111. A pad 104 is coupled to pin 71 of memory address bus 51. Adjacent to pad 104 is a pad 106 which is coupled to pin 81 of memory address bus 52. Likewise, a pad 105 is coupled to pin 72, and a pad 107 is coupled to pin 82. Each pad 104–107 is also coupled to power bus 102 and ground bus 103. By interspersing pads from each memory bus 51 and 52, power bus 102 and ground bus 103 can be more efficiently shared between the buses.

Figure 5:
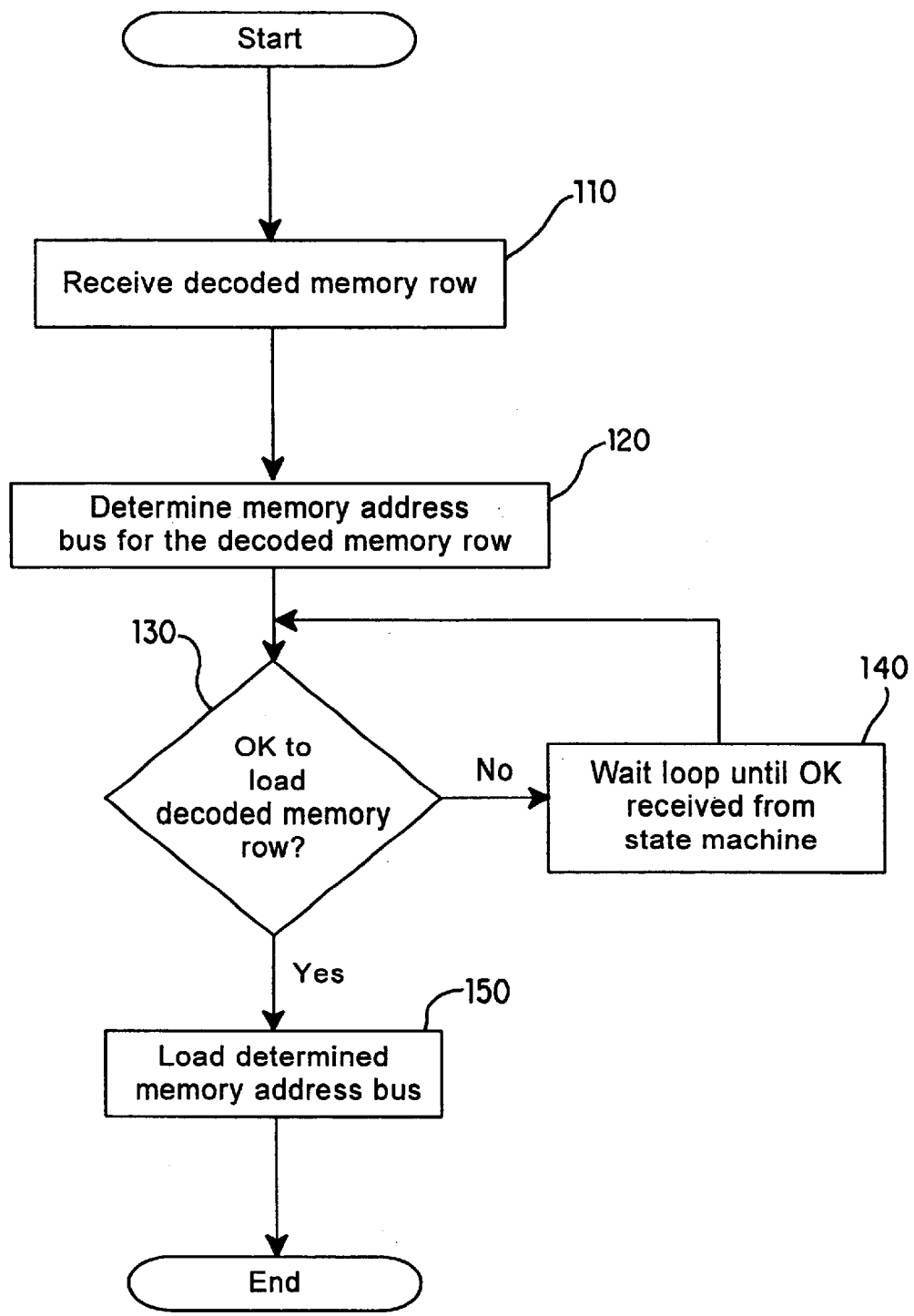
FIG. 5 is a flowchart illustrating the steps executed by a logic block in one embodiment of the present invention.

FIG. 5 is a flowchart illustrating the steps executed by logic block 66. In one embodiment, logic block 66 is implemented in hardware on the die of memory controller 50.

At step 110, logic block 66 receives the decoded memory row from row decoder 64. At step 120, the memory address bus that is coupled to the received memory row (i.e., either memory address bus 51 or 52) is determined.

At step 130, logic block 66 determines whether the decoded memory row can be loaded by examining the input from state machine 68. If the memory row cannot be loaded, at step 140 logic block 66 goes into a wait loop by continuously returning to step 130 until the row can be loaded.

When state machine 68 outputs that the decoded row can be loaded, at step 150 logic block 66 loads the memory address bus determined at step 120 with the memory address transmitted on memory request bus 90. The memory address bus is loaded by turning on the output enable line 74, 84 that corresponds to the determined memory address bus 51, 52. Specifically, if the decoded memory row is coupled to memory address bus 51, output enable line 74 is turned on to load the bus. Similarly, if the decoded memory row is coupled to memory address bus 52, output enable line 84 is turned on to load the bus.

As described, the memory controller in accordance with one embodiment of the present invention includes two memory address buses. However, only one memory address bus is toggled at a time. Therefore, power and ground pins can be shared by the memory address buses, and the required number of power and ground pins is reduced.

Several embodiments of the present invention are specifically illustrated and/or described herein. However, it will be appreciated that modifications and variations of the present invention are covered by the above teachings and within the purview of the appended claims without departing from the spirit and intended scope of the invention.

For example, more than two memory address buses can be included on the memory controller if required by an increased load. All of the memory address buses can continue to share the same power and ground pins if at any one time only one of the memory address buses is toggled.

Further, although memory controller 50 is shown as a separate integrated circuit, in other embodiments the integrated circuit that includes memory controller 50 may also include other functionality such as a processor. In addition, the present invention can be implemented with any device that includes more than one memory address bus.

What is claimed is:

1. An integrated circuit memory controller comprising:
    a first memory address bus;
    a second memory address bus;
    circuitry to toggle between said first and second memory address buses; and
    a power pin coupled to both said first and said second memory address buses.

2. The integrated circuit memory controller of claim 1, wherein said first and second memory buses comprise a plurality of memory address pins, and wherein a ratio of said plurality of memory address pins to said power pin is approximately 8:1.

3. The integrated circuit memory controller of claim 1, said power pin comprising:
    a plurality of power pins, each of said plurality of power pins coupled to both said first and said second memory address buses.

4. The integrated circuit memory controller of claim 1, further comprising:
    a ground pin coupled to both said first and said second memory address buses.

5. The integrated circuit memory controller of claim 4, said ground pin comprising:
    a plurality of ground pins, each of said plurality of ground pins coupled to both said first and said second memory address buses.

6. An integrated circuit memory controller comprising:
    a first memory address bus;
    a second memory address bus; and
    circuitry including a first output enable line and a second output enable line toggling one of said first and second memory address buses at a time, said circuitry further including:
        a flip-flop;
        a multiplexer coupled to said flip-flop, said multiplexer including a selector input;
        an output enable source coupled to said selector input;
        a row decoder coupled to said output enable source; and
        a memory request bus, wherein:
            said first memory address bus includes a memory address pin;
            said flip-flop has an input, and an output coupled to said address pin; and
            said multiplexer has a first input coupled to said memory request bus, a second input coupled to said flip-flop output, and an output coupled to said flip-flop input.

7. The integrated circuit memory controller of claim 1, wherein said first memory address bus is coupled to a first memory slot and said second memory address bus is coupled to a second memory slot.

8. The integrated circuit memory controller of claim 7, wherein a plurality of memory devices are inserted in said memory slots.

9. The integrated circuit memory controller of claim 8, wherein said memory devices are dynamic random access memory devices.

10. A computer system comprising:
    a processor;
    a power source;
    an integrated circuit memory controller coupled to said processor, said integrated circuit memory controller comprising:
        a first memory address bus;
        a second memory address bus; and
        a power pin coupled to said power source, said power pin coupled to both said first memory address bus and said second memory address bus;
    a first memory slot coupled to said first memory address bus;
    a second memory slot coupled to said second memory address bus; and
    circuitry to toggle between said first and second memory address buses.

11. The computer system of claim 10, wherein said first and second memory buses comprise a plurality of memory address pins, and wherein a ratio of said plurality of memory address pins to said power pin is approximately 8:1.

12. A computer system comprising:
    a processor;
    a memory controller coupled to said processor, said memory controller including a first memory address bus and a second memory address bus, said first memory address bus having a plurality of first pads, said second memory address bus having a plurality of second pads, each of said first pads disposed adjacent to at least one of said second pads;
    a first memory slot coupled to said first memory address bus;
    a second memory slot coupled to said second memory address bus; and
    circuitry including a first output enable line and a second output enable line toggling said first and second memory address buses one at a time.

13. A computer system comprising:
    a processor;
    a memory controller coupled to said processor, said memory controller comprising a first memory address bus and a second memory address bus, wherein said memory controller comprises:
        an output pin;
        a flip-flop having an input, and having an output coupled to said output pin;
        a multiplexer having an output coupled to said flip-flop input, and having a first input, a second input and a selector, wherein said first input is coupled to said flip-flop output;
        a memory request bus coupled to said second multiplexer input; and
        an output enable source coupled to said multiplexer selector;
    a first memory slot coupled to said first memory address bus;
    a second memory slot coupled to said second memory address bus; and circuitry including a first output enable line and a second output enable line toggling said first and second memory address buses one at a time.

14. The computer system of claim 10, said power pin comprising:
   a plurality of power pins, each of said plurality of power pins coupled to both said first and said second memory address buses.

15. The computer system of claim 10, further comprising:
   a first plurality of memory devices inserted in said first memory slot; and
   a second plurality of memory devices inserted in said second memory slot.

16. The computer system of claim 15, wherein said first and second plurality of memory devices are dynamic random access memory devices.

17. The memory controller of claim 10, further comprising:
   a ground pin coupled to both said first and said second memory address buses.

18. The computer system of claim 17, said ground pin comprising:
   a plurality of ground pins, each of said plurality of ground pins coupled to both said first and said second memory address buses.

19. A method of addressing a memory device installed in one of a plurality of memory rows in a computer system, said method comprising:
   determining one of a plurality of memory address buses that is coupled to said one memory row, wherein a power pin is coupled to each of said plurality of memory address buses on an integrated circuit;
   determining whether said one memory row can be addressed; and
   toggling said determined one memory address bus, through circuitry coupled to each of said plurality of memory address buses on said integrated circuit to identify which one of said plurality of memory address buses is active.

20. The method of claim 19, said method further comprising:
   waiting until said one memory row can be addressed if it is determined that said one memory row cannot be addressed.

21. The method of claim 19, wherein each of said plurality of memory rows is coupled to one of said plurality of memory address buses.

22. The method of claim 21, wherein two of said plurality of memory rows form a memory slot.

* * * * *